United States Patent [19]

Takemori

[11] 4,174,768

[45] Nov. 20, 1979

[54] CALIPER CARRYING STRUCTURE FOR TILTING TYPE DISC BRAKE

[75] Inventor: Fumio Takemori, Iwatsuki, Japan

[73] Assignee: Akebono Brake Industry Co., Ltd., Tokyo, Japan

[21] Appl. No.: 885,976

[22] Filed: Mar. 13, 1978

[30] Foreign Application Priority Data

Mar. 16, 1977 [JP] Japan .............................. 52-31920[U]

[51] Int. Cl.² .......................................... F16D 55/224
[52] U.S. Cl. .................... 188/72.3; 188/71.8; 188/73.3
[58] Field of Search ................... 188/71.1, 72.1, 72.3, 188/72.4, 73.3, 71.8, 73.5, 196 P

[56] References Cited

U.S. PATENT DOCUMENTS

| | | | |
|---|---|---|---|
| 2,533,186 | 12/1950 | Bricker et al. | 188/73.3 |
| 3,166,157 | 1/1960 | Burnett | 188/71.1 |
| 3,499,509 | 3/1970 | Erdmann et al. | 188/72.1 |
| 4,084,666 | 4/1978 | Karasudani | 188/73.3 |

FOREIGN PATENT DOCUMENTS 1030320 5/1966 United Kingdom ..................... 188/72.3

*Primary Examiner*—Edward R. Kazenske
*Attorney, Agent, or Firm*—Toren, McGeady and Stanger

[57] ABSTRACT

A disc brake of a tilting type wherein a caliper comprising a pad pushing mechanism disposed on one side of a disc and a reaction part disposed on the other side of the disc to receive a reaction force developed by the action of the pad pushing mechanism to push a pair of friction pads against both sides of the disc, the caliper being arranged to sway on a support shaft disposed in parallel with a tangential direction of the disc.

7 Claims, 3 Drawing Figures

CALIPER CARRYING STRUCTURE FOR TILTING TYPE DISC BRAKE

BACKGROUND OF THE INVENTION

This invention relates to an improvement on a disc brake of a tilting type wherein a caliper comprising a pad pushing mechanism disposed on one side of a disc and a reaction part disposed on the other side of the disc to receive a reaction force developed by the action of the pad pushing mechanism to push a pair of friction pads against both sides of the disc, the caliper being arranged to sway on a support shaft disposed in parallel with a tangential direction of the disc.

The disc brake of such a tilting type has been developed in contrast with a floating type disc brake, which has a caliper arranged to move in the axial direction of a disc. The tilting type disc brake is arranged to sway a caliper on a shaft to attain the same effect as the floating type disc brake. It is an advantage of the disc brake of such a type over the floating type that the structural arrangement of a support for carrying the caliper can be made much simpler than the floating type.

The present invention is directed to further improvement in the caliper carrying structure arrangement in a tilting type disc brake which is suitable for a motor bicycle. In the structural arrangement for carrying a caliper in such a disc brake, the boss of the caliper is inserted in a support shaft having a flange. The end face of the boss is arranged to abut on the flange and is prevented from slipping off the support shaft with a washer or a clip applied thereto. Further, there is provided a seal part for the purpose of maintaining the smoothness of sliding contact faces.

SUMMARY OF THE INVENTION

It is an object of this invention to provide a tilting type disc brake wherein the shape and location of the seal part thereof are arranged to absorb a machining tolerance in the axial direction of the support and to prevent draging of a friction pad which tends to take place on the outer side of the brake when the brake is released from a braking operation.

The above and further objects, features and advantages of the invention will become apparent from the following detailed description of a preferred embodiment example taken in conjunction with the accompanying drawings.

DETAILED DESCRIPTION OF THE PREFERRED EMBODIMENT

Figure 1:
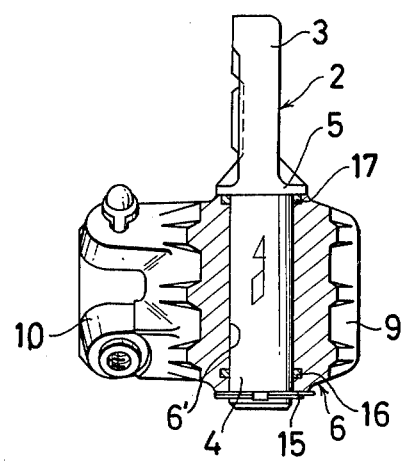
FIG. 1 is a partially sectional plan view showing a tilting type disc brake as an embodiment of the present invention.

Referring to the accompanying drawings which show a preferred embodiment of the present invention, a reference numeral 1 denotes a disc which is rotatable together with a wheel; and 2 denotes a support shaft which is disposed outside of the edge portion of the disc 1 in the direction of a tangential line of the disc 1. The support shaft 2 is provided with a mounting part 3 which is to be attached to an unillustrated stationary part in the structure of a vehicle, a shaft part 4 which is to be rotatably engaged with a caliper 6 in a sliding manner and a flange part 5 which has a torque receiving face abutting on an end face of the caliper 6 to receive a torque developed when the brake is applied.

Reference numerals 7 and 8 denote a pair of friction pads disposed on both sides of the disc 1. The friction pad 7 which is disposed on the outer side of the disc is attached with a pad clip 11 to a reaction part 9 which is one of two parts of the caliper 6 confronting each other across the disc 1. The other friction pad 8 which is disposed on the inner side of the disc is attached also with a pad clip 11 to the fore end face of a pad pushing piston 12 which slidably engages with a cylinder part 10 which is the other part of the above stated two confronting parts of the caliper.

Figure 2:
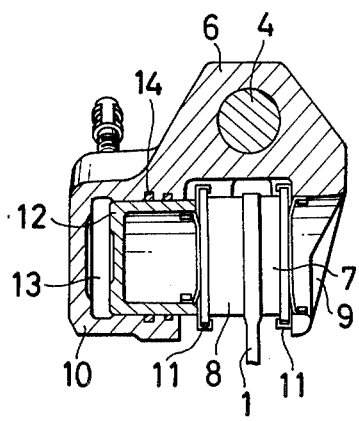
FIG. 2 is a vertical sectional view showing the tilting type disc brake.
Figure 3:
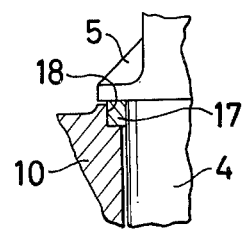
FIG. 3 is an enlarged sectional view showing a part of the tilting type disc brake.

Numeral 13 denotes a fluid pressure chamber; 14 denotes a piston seal; and 15 denotes a washer which is secured to the shaft part 4 of the support shaft 2 to prevent the caliper from comming off by restricting the movement of the caliper 6 in the direction opposite to the flange part 5. Numerals 16 and 17 denote seal members made of an elastic material. The present invention is characterized by the manner in which these members are assembled. One of these members, i.e. the seal member 16, is inserted in between the boss of the caliper and the tip of the shaft part 4 of the support shaft 2 to serve the same purpose as those used for the conventionally known seal members. On the other hand, the other seal member 17 is fitted into a circumferential groove 18 which is formed in the edge of an opening 6' at the other end of the boss of the caliper. Then, the seal member 17 is arranged to protrude to a given extent from the end face of the boss of the caliper to engage with the flange part 5 in such a way as to leave a clearance between the boss of the caliper 6 and the flange part 5. Meanwhile, the rotating direction of the disc 1 during the forward movement of the vehicle is as shown by an arrow mark in FIG. 1. The fluid pressure inside the chamber 13 causes the piston 12 to push the inner friction pad 8 against the disc 1. Then, a reaction force to the pushing action of the piston 12 causes the caliper 6 to sway on the shaft part 4 in the clockwise direction as viewed in FIG. 2. This swaying move of the caliper causes the reaction part 9 to push the outer friction pad 7 against the disc 1. Then, the brake torque developed at the two friction pads 7 and 8 is absorbed by a torque receiving faces provided on the sides of the caliper adjacent to the two friction pads 7 and 8. The torque force received by the torque receiving faces is transferred to the flange part 5 of the support shaft 2.

With the disc brake arranged as described in the foregoing, when the caliper is inserted into the support shaft 2, a machining tolerance which has been made in the axial direction thereof can be absorbed by the elastic deformation of the seal member 17. Meanwhile, an elastic deformation of the seal member 17 not only permits to have a satisfactory sealing effect on the sliding engagement face of the shaft part 4 but also ensures improved smoothness for the swaying movement of the caliper.

It is a further advantageous feature of the present invention that the arrangement to allow one side face of the seal part 17 disposed in the axial direction of the shaft part 4 of support shaft 2 to abut on the flange part 5 of the support shaft 2 enables to efficiently obtain the elastic deformation of the seal member 17 in the direction in which the caliper sways when the brake is applied.

The caliper 6 is arranged to come into contact with the flange part 5 of the support shaft 2 when the brake is applied. With this arrangement, the degree to which the seal member 17 is compressed during the braking operation is restricted to a predetermined extent.

This means that a resilient restorative force of the seal member 17 serves to sway back to a predetermined degree the swaying movement of the caliper 6 when the brake is released from a braking operation. Then, the swaying back by the seal member 17 serves to pull back the outer friction pad 7 away from the disc 1 to leave a given degree of clearance there. On the other hand, the inner friction pad is also pulled back by the resilient restorative force of the elastic deformation of the piston seal 14 away from the disc 1 leaving a given degree of clearance there in the same manner as in the conventional tilting type disc brake. Therefore, these pulling back effects brought about on both the friction pads 7 and 8 serves to effectively solve the problem of dragging that otherwise takes place at the time of brake release.

As described in the foregoing, the tilting type disc brake improved in accordance with the present invention has a simpler structural arrangement than the conventional brakes and yet gives various effects which ensure great advantages for practical applications of the invention.

What is claimed is:

1. A tilting type disc brake comprising: a rotatable disc to which said brake is applied; a support shaft having a longitudinal axis oriented parallel to a plane defined by a side of said disc and a shaft part and a flange part; a pair of friction pads disposed on both sides of said disc; a caliper provided with pushing means which acts to push one of said pair of friction pads against one side of said disc and a reaction part which pushes the other of said friction pads against the other side of said disc by reaction to the action of said pushing means, said caliper also having an opening through which the shaft part of said support shaft is inserted for mounting said caliper on said support shaft for pivoting movement between a resting position and a pivoted position; and a single elastic ring fitted in a circumferential groove formed in the edge of said opening of said caliper with one side face thereof being disposed and arranged in the axial direction of said shaft part of said support shaft to engage the flange part of said support shaft and with the inner circumferential face thereof arranged to engage said shaft part, said elastic ring being arranged to normally hold said caliper resiliently in the axial direction of said shaft part with a clearance between the edge of the opening of said caliper and the flange part of said support shaft and being capable of bringing said caliper back from said pivoted position to said resting position thereof when the brake is released from a braking operation.

2. A tilting type disc brake according to claim 1, wherein at the shaft part of said support shaft, there is provided stopping means for restricting the movement of said caliper in the direction opposite to the flange part.

3. A tilting type disc brake according to claim 2 wherein said stopping means is a washer secured to said shaft part, said caliper being caused to be in contact with said washer by an elastic force of said elastic ring.

4. A tilting type disc brake according to claim 3 wherein said opening of the caliper opens at both ends thereof with said elastic ring being disposed only on the edge of one end of the opening.

5. A tilting type disc brake according to claim 4 wherein said one end of said opening of said caliper on which said elastic ring is disposed is on the side of said caliper where said disc rotates outward in the normal forward rotational direction thereof.

6. A tilting type disc brake according to claim 5 wherein there is provided a seal ring close to but at a slight distance away from the end edge of the opening of said caliper on the side thereof where said disc rotates inward in said normal forward rotational direction thereof.

7. A tilting type disc brake according to claim 1, wherein said caliper is provided with a mechanism for absorbing a brake torque which develops at said pair of friction pads when the brake is applied; and the brake torque absorbed by the caliper during the forward movement of the vehicle is transferred to the flange part of said support shaft.

* * * * *